US008832389B2

(12) United States Patent
Desai et al.

(10) Patent No.: US 8,832,389 B2
(45) Date of Patent: Sep. 9, 2014

(54) DOMAIN BASED ACCESS CONTROL OF PHYSICAL MEMORY SPACE

(75) Inventors: Saurabh Desai, Austin, TX (US); George Mathew Koikara, Bangalore (IN); Pruthvi Panyam Nataraj, Bangalore (IN); Guha Prasad Venkataraman, Chennai (IN); Vidya Ranganathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 13/006,626

(22) Filed: Jan. 14, 2011

(65) Prior Publication Data

US 2012/0185661 A1 Jul. 19, 2012

(51) Int. Cl.
*G06F 13/00* (2006.01)
*G06F 12/14* (2006.01)

(52) U.S. Cl.
CPC ................................ *G06F 12/1491* (2013.01)
USPC ...................... 711/153; 711/173; 711/E12.02

(58) Field of Classification Search
USPC .................................................. 711/173, 203
See application file for complete search history.

(56) References Cited

U.S. PATENT DOCUMENTS

| | | | | |
|---|---|---|---|---|
| 5,666,519 A | * | 9/1997 | Hayden | ............................. 703/23 |
| 5,845,129 A | * | 12/1998 | Wendorf et al. | ............... 710/200 |
| 5,864,683 A | | 1/1999 | Boebert et al. | |
| 5,889,952 A | | 3/1999 | Hunnicutt et al. | |
| 6,292,494 B1 | | 9/2001 | Baker et al. | |
| 6,519,647 B1 | | 2/2003 | Howard et al. | |
| 7,017,183 B1 | | 3/2006 | Frey et al. | |
| 7,200,869 B1 | | 4/2007 | Hacherl et al. | |
| 7,591,015 B2 | | 9/2009 | Cargille et al. | |
| 8,107,973 B1 | | 1/2012 | Sjothun | |
| 2002/0188738 A1 | | 12/2002 | Gray et al. | |
| 2003/0009685 A1 | | 1/2003 | Choo et al. | |
| 2003/0041154 A1 | | 2/2003 | Tran | |
| 2004/0243835 A1 | | 12/2004 | Terzis et al. | |
| 2005/0188173 A1 | * | 8/2005 | Hasbun et al. | ................ 711/203 |
| 2005/0273851 A1 | | 12/2005 | Raju Datla et al. | |
| 2006/0259487 A1 | | 11/2006 | Havens et al. | |
| 2007/0011136 A1 | | 1/2007 | Haskin et al. | |
| 2007/0039045 A1 | | 2/2007 | McKee et al. | |
| 2007/0121632 A1 | | 5/2007 | Zabarski | |

(Continued)

FOREIGN PATENT DOCUMENTS

WO WO2009023586 2/2009

OTHER PUBLICATIONS

Lindermann. Technische Universitat Munchen; Different DSM Types [online] [retrieved on Dec. 5, 2012] Copyright 2009. Retrieved from the Internet < http://129.187.108.94/dsmweb/en/understand-dsm/technical-dsm-tutoria10/different-dsm-types.html>.*

(Continued)

*Primary Examiner* — Sean D Rossiter
(74) *Attorney, Agent, or Firm* — DeLizio Gilliam, PLLC (57) ABSTRACT

Domains can also be used to control access to physical memory space. Data in a physical memory space that has been used by a process sometimes endures after the process stops using the physical memory space (e.g., the process terminates). In addition, a virtual memory manager may allow processes of different applications to access a same memory space. To prevent exposure of sensitive/confidential data, physical memory spaces can be designated for a specific domain or domains when the physical memory spaces are allocated.

14 Claims, 4 Drawing Sheets

(56) References Cited

U.S. PATENT DOCUMENTS

| | | | |
|---|---|---|---|
| 2007/0214497 | A1 | 9/2007 | Montgomery et al. |
| 2008/0071804 | A1 | 3/2008 | Gunda et al. |
| 2008/0244206 | A1* | 10/2008 | Heo et al. ............... 711/163 |
| 2009/0037682 | A1* | 2/2009 | Armstrong et al. ....... 711/164 |
| 2010/0162362 | A1 | 6/2010 | Battle et al. |
| 2010/0290475 | A1 | 11/2010 | Belanger et al. |
| 2011/0153975 | A1* | 6/2011 | Accapadi et al. ......... 711/170 |
| 2011/0161644 | A1* | 6/2011 | Nojiri et al. ............... 713/1 |
| 2012/0185581 | A1 | 7/2012 | Desai et al. |
| 2012/0185930 | A1 | 7/2012 | Desai et al. |

OTHER PUBLICATIONS

Abdullah, Ariff et al., "FreeBSD Handbook", Chapter 13, Section 8, http://www.freebsd.org/doc/en/books/handbook/users-groups.html (Date Obtained from the Internet: Aug. 25, 2010) 2010 , 2 pages.

Barkley, John , "Comparing Simple Role Based Access Control Models and Access Control Lists", *Proceeding RBAC '97 Proceedings of the second ACM workshop on Role-based access control* http://delivery.acm.org/10.1145/270000/266769/p127-barkley.pdf?key1=266769&key2=2108522921&coll=DL&d1=ACM&CFID=1856933&CFTOKEN=58395003 (Obtained from the internet on Dec. 13, 2010) Aug. 11, 1997 , pp. 127-132.

FreeBSD, "13.8 Groups", *FreeBSD Handbook: Chapter 13 Users and Basic Account Management* http://www.freebsd.org/doc/handbook/users-groups.html (Obtained from the internet on Aug. 25, 2010) No. Publication Date Found , 2 pages.

Gorman, Mel , "Understanding the Linux Virtual Memory Manager", http://www.phptr.com/perens 2004 , 748 pages.

IBM, "Concepts, Planning, and Installation Guide", *General Parallel File System, Version* 3.1 Apr. 2006 , 144 pages.

IBM, "Snapshots Reinvented: IBM XIV Storage System", Sep. 2008 , 17 pages.

IBM, "Welcome to the AIX 6.1 Information Center", http ://publib.boulder.ibm.com/infocenter/aix/v6r1/index.jsp?topic=/com.ibm.aix.doc/doc/base/aixinformation.htm (Date Obtained from the Internet Aug. 3, 2010). 1989 , 1 page.

Shepler, S. et al., "NFS version 4 Protocol", *Network Working Group* http://tools.ietf.org/html/rfc3010 (Obtained from the Internet on Aug. 25, 2010) Dec. 2000 , 213 pages.

Sun Microsystems, "Lustre File System: High-Performance Storage Architecture and Scalable Cluster File System", *White Paper* http://www.raidinc.com/pdf/whitepapers/lustrefilesystem_wp.pdf Oct. 2008 , 20 pages.

Tivoli, "Architectural overview of a clustered environment", *Composite Version* 6.0 http://publib.boulder.ibm.com/infocenter/tivihelp/v3r1/index.jsp?topic=% 2Fcom.ibm.itcamrtt.doc 6.0%2FITCAMfTT_InstallConfig10.htm No. Publication Date Found , 3 pages.

U.S. Appl. No. 13/006,618, filed Jan. 14, 2011, Desai, Saurabh et al.
U.S. Appl. No. 13/006,621, filed Jan. 14, 2011, Desai, Saurabh.
U.S. Appl. No. 13/006,634, filed Jan. 14, 2011, Desai, Saurabh.
"U.S. Appl. No. 13/006,634 Office Action", Mar. 28, 2013 , 20 pages.
"U.S. Appl. No. 13/006,618 Final Office Action", May 9, 2013 , 29 pages.
"U.S. Appl. No. 13/006,618 Office Action", Oct. 22, 2012, 13 pages.

* cited by examiner

DOMAIN BASED ACCESS CONTROL OF PHYSICAL MEMORY SPACE

BACKGROUND

Embodiments of the inventive subject matter generally relate to the field of computers, and, more particularly, to controlling access to memory space of a computer.

On conventional operating systems, the physical memory space is usually protected in accordance with segmenting and/or paging. With memory segmenting, a memory is protected by enforcing permissions of a segment against a process. With paging the same physical memory can be reused by different processes and users. The decision of which processes to map to which physical memory segment is done by a memory manager of the operating system.

SUMMARY

Embodiments include a method comprising determining that a domain is associated with a first process in response to the first process requesting an operating system instance for access to a portion of a physical memory space. The domain represents an organizational entity and the portion of the physical memory space is represented by at least a memory address. A portion of the physical memory space that is not designated for a domain according to a plurality of domain isolation rules is selected. An additional domain isolation rule is added to the plurality of domain isolation rules. The added domain isolation rule identifies the portion of the physical memory space as designated for the domain associated with the first process. The portion of the physical memory space is allocated to the first process. A second process that is associated with a second domain is prevented from accessing the portion of the physical memory space

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description. In addition, the term "application" is used herein to refer to a computer program or a collection of computer programs. An application can be a user application or a system application. A user application is initiated by a user, and a system application is initiated by a system. The term "process" is used herein to refer to an executing instance of a computer program. Thus, multiple processes may correspond to an application.

The terms "application," "tool," "utility," and "script are used herein to refer to one or more computer programs. The terms "process" and "instance" are used hereinto refer to an executing computer program or executing part of a computer program. To illustrate, an "operating system instance" refers to an instantiated or executing operating system computer program. A "kernel process" refers to a kernel program or kernel service executing in kernel space. "Kernel space" refers to the execution space of the kernel. The description also uses the term "subject" to refer to executing instances of kernel code, application code, a utility, or a tool.

An operating system ("OS") can support access to objects (e.g., devices, file systems, volume groups, files, etc.) for different departments of an organization and for different purposes (e.g., management of the object, writing to the object, viewing the object, invoking an object, etc.). For instance, an OS can support different applications/systems and data for a legal department, a human resources ("HR") department, and a finance department. The OS can support an electronic mail system for all three departments. The OS can also support a docketing application for the legal department and a bookkeeping application for the finance department. The OS may also support a job application database and employee complaint database for the HR department. An organization may want to isolate the objects for the different departments at a granularity greater than currently available. An administrator can create domains for these different departments to isolate the objects of the departments (e.g., database records, department file systems, etc.) for confidentiality reasons, to conform to organizational task divisions (e.g., different information technology departments may support the different departments), etc.

Functionality can be implemented in an operating system to increase the granularity of isolation for objects. A domain can be defined to represent each of different entities (e.g., different departments or work groups). User identifiers and/or user credentials can be associated with the appropriate domain or domains. For instance, an administrator can configure users as members of particular domains. An administrator can then define a set of rules that govern operation(s) that can be performed on the objects based on the domains. The operations can be in response to commands or instructions from an executing application, executing script, process, etc. Processes or subjects running on a system will inherit the domain or domains of a user account logged into the system. A kernel process, for example, can evaluate the set of rules that specify which domains facilitate access to which objects. When a process or subject attempts to perform an operation on an object (e.g., mount a file system or device, create a volume group, view or write to a file, etc.), the kernel process evaluates the domain inherited by the process, and consequently the operation, and the object against the set of rules to determine whether the operation is permitted to proceed.

Figure 1:
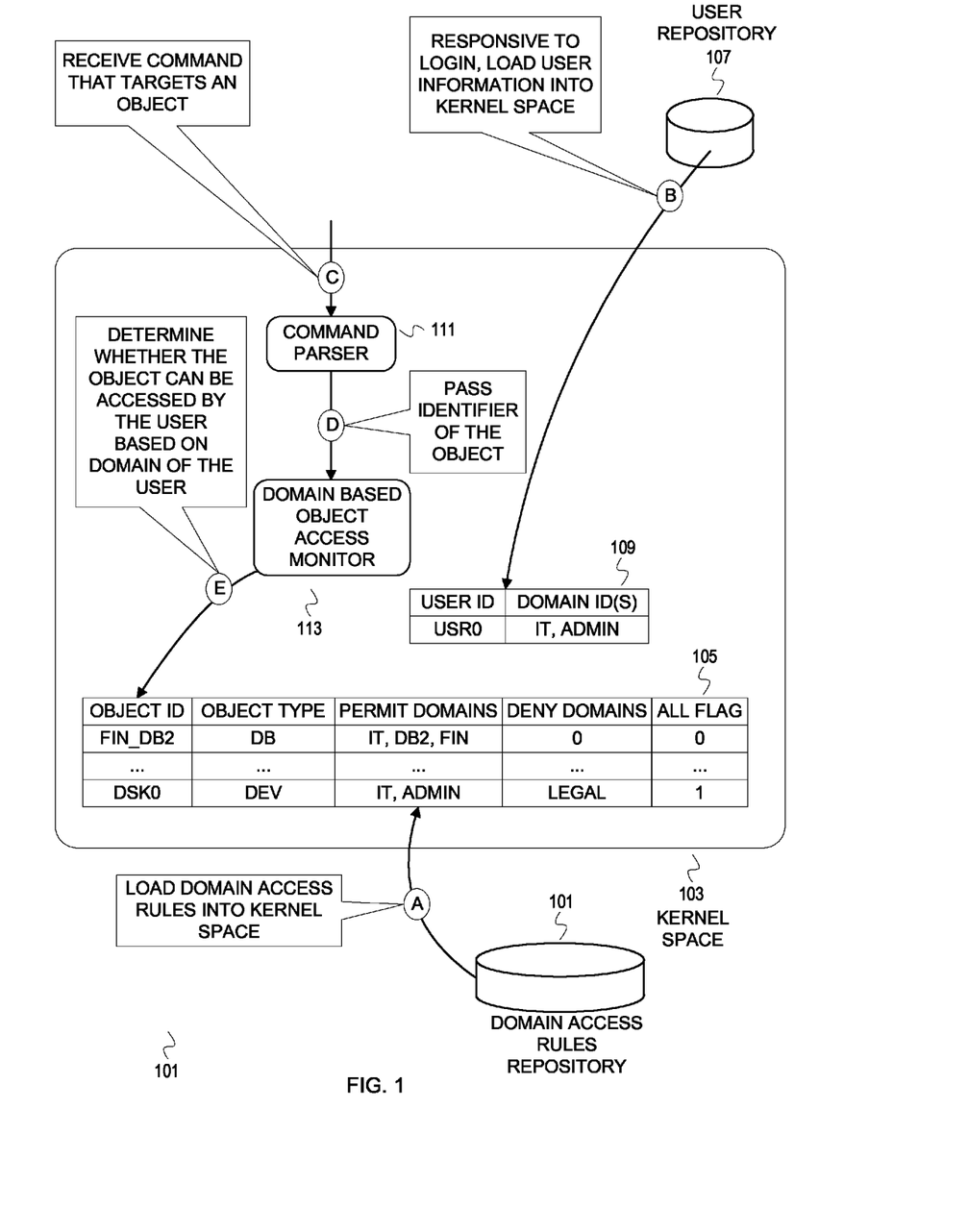
FIG. 1 depicts an example conceptual diagram of domain based object isolation enforced in a kernel space.

FIG. 1 depicts an example conceptual diagram of domain based object isolation enforced in a kernel space. A kernel space 103 comprises a kernel command parser 111 and a domain based object isolation monitor 113. The kernel space 103 represents memory and processes of a kernel on a machine. The kernel command parser 111 represents executing kernel code that parses commands/instructions initiated in user space of the machine hosting the kernel space 103. Although a kernel command parser 111 is not necessarily involved in receiving a command or instruction from user space, FIG. 1 depicts an example involving a command parser to avoid encumbering the description with alternatives.

The machine that hosts the kernel space 103 is communicatively coupled with a user repository 107. The user repository 107 hosts user data (e.g., user credentials, user profiles, etc.) of users that login into the machine. The user data at least includes user identifiers (e.g., usernames, serial numbers, etc.) and associated domains. Each user can be associated with 0 to n domains. When a user is assigned or associated with a domain, the system that manages the user repository 107 updates the corresponding user data to indicate the domain. For instance, a system that supports the creation of domains submits a request to the system that supports the user repository 107 to update a user profile, for example, to indicate a domain. The user repository 107 may be local to the machine that hosts the kernel space 103. The user repository may be distributed throughout a cluster or hosted at a device designated for hosting the user data accessible via a network.

The machine also has access to a domain isolation rules repository 101. The domain isolation rules repository 101 comprises domain isolation rules that indicate which domains are permitted for which objects. A storage device that hosts the domain isolation rules repository 101 can be local or remote with respect to the machine that hosts the kernel space 103.

A root user, super user, or a user with a highest privilege can create domains and domain isolation rules. For instance, a root user can create a domain for IT administrators. The root user can also create a database domain. The root user can define a rule that allows access to manage database objects for users who are assigned to both the IT administrator domain and the database domain. The root user can also define a rule that allows access to manage email objects (e.g., email servers) for users assigned to the IT administrator domain and an "email" domain previously created by the root user.

Defining a domain can comprise establishing an identifier for a domain (e.g., a domain name, a unique numerical identifier, etc.) and a description of the domain. A system that hosts a repository of domains can enforce uniqueness of domain identifiers as unique names and/or generate unique numbers for domains across a node or network. Defining a domain isolation rule comprises indicating an object and a domain(s) that facilitates performance of operation on the object ("permitted domain"). Defining a rule can also comprise specifying a domain that does not facilitate performance of an operation ("denied domain") on the object. For instance, a user may be assigned to an IT domain and a LEGAL domain. A rule may allow a management operation on a particular object if the operation is associated with a user who is a member of the IT domain and an HR domain. A rule may specify that the IT domain is a permitted domain, but the LEGAL domain is a denied domain. Even though the user is a member of the IT domain, an operation associated with the user is not allowed to be performed on an object governed by the rule because the user is also a member of a denied domain. Embodiments can also indicate a flag that represents a constraint of "ANY" or "ALL" domains for an object in a domain isolation rule. If the ALL flag is set in a rule, then an operation associated with a user who is a member of all of the permitted domains indicated in the rule can be performed. Membership in only one of the permitted domains would be insufficient. The ANY or ALL flag can be represented by a single bit or a complex structure. For example, a value of 1 can indicate that ALL domains are required, while a value of 0 can indicate that ANY of the permitted domains is sufficient.

Returning to the example depicted in FIG. 1, a set of domain isolation rules 105 are loaded into the kernel space 103 from the domain isolation rules repository 101 at a stage A. Although embodiments can load all of the domain isolation rules into the kernel space 103, embodiments can also limit loading to a subset of the rules. In addition, the domain isolation rules repository may index or organize rules by various criteria. For example, a set of domain isolation rules can be associated with a particular machine. As another example, domain isolation rules can be loaded after login based on domain membership or credentials of the user that logs into the machine.

At a stage B, user information is loaded into the kernel space 103 from the user repository 107 responsive to a user logging into the machine that hosts the kernel space 103. The user information loaded into the kernel space 103 is instantiated as a user structure instance 109. The user structure instance 109 at least indicates a user identifier and a domain associated with the user represented by the user identifier. In this example, the user identifier is "USR0." The USR0 is a member of the IT domain and the ADMIN domain.

At a stage C, a kernel command parser 111 receives an instruction from user space that targets an object. For example, a user may enter a request to mount a device or increase the size of a filesystem.

At a stage D, the kernel command parser 111 passes an identifier of the object targeted by the instruction to the domain based object isolation monitor 113. For instance, the kernel command parser can call a function that implements the domain based object isolation monitor with the object identifier passed as a parameter. As another example, the kernel command parser 111 can receive a message through a system call which indicates the object identifier to the domain based object isolation monitor 113.

At a stage E, the domain based object isolation monitor 113 determines whether the instruction can be applied to the object (i.e., whether the one or more operations that implement the instruction can be performed on the object) based on the domain(s) of the user associated with the instruction. The domain based object isolation monitor 113 accesses the set of domain isolation rules 105. The set of domain isolation rules 105 indicates an object identifier, an object type, permitted domains, denied or conflict domains, and an ANY or ALL flag. The set of domain isolation rules 105 includes a rule that indicates a database object "FIN_DB2" can be operated upon by an operation(s) associated with any one of the domains IT, DB2, and finance ("FIN"). The set of domain isolation rules 105 also includes a rule that permits access to a device object "DSK0" by an operation(s) associated with a user who is a member of all of the domains IT and ADMIN. Since the USR0 is a member of both the IT domain and the ADMIN domain, a command/instruction that targets the device DSK0 would be allowed to proceed. If the command/instruction targeted the FIN_DB2 object, then the operation(s) that implement the command/instruction would not be permitted to operate upon the FIN_DB2 object.

Although the depicted example refers to a command, embodiments are not so limited. Embodiments can determine whether an operation being performed by an application is permitted to operate upon or access an object. The application would be executing as a process in a user space invoked by a user. The application process inherits the domain of the user. Thus, the corresponding domain identifier of that user would be used to evaluate the set of domain isolation rules against the operation for the object. In addition, embodiments are not limited to specifying particular object identifiers. An administrator can define a rule that governs access to manage types of objects. The administrator could indicate an ANY flag or a wildcard for the object identifier and specify an object type.

When the domain based object isolation monitor encounters the wildcard or object identifier ALL flag, then the monitor would evaluate the rule against the type of object that an operation is attempting to operate upon. Further, embodiments are not limited to specifying permitted domains. An embodiment can evaluate a rule that only specifies a denied or conflict domain as allowing all domains not indicated as a denied or conflict domain.

Figure 2:
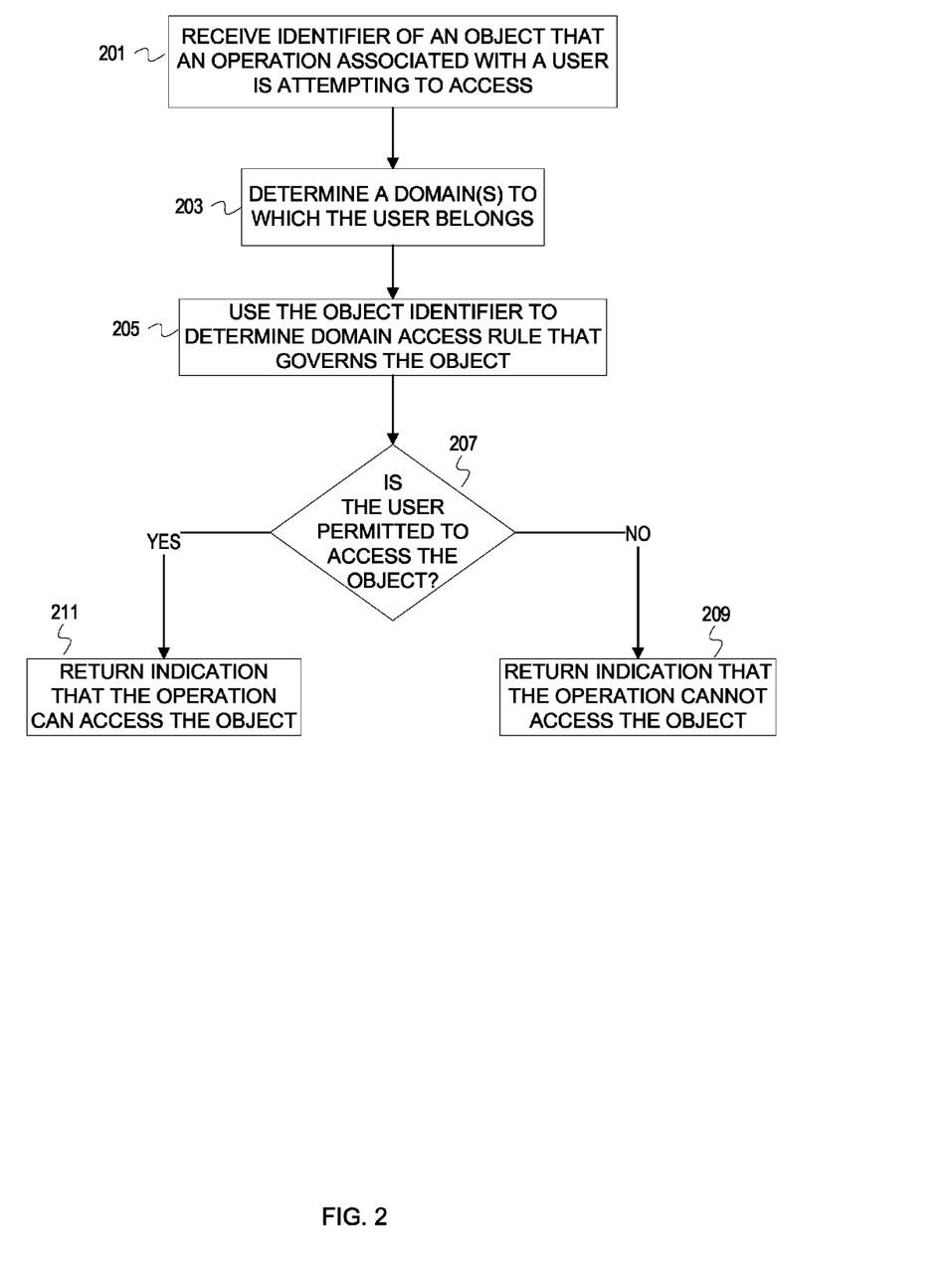
FIG. 2 depicts a flowchart of example operations for evaluating a domain isolation rule for an object.

FIG. 2 depicts a flowchart of example operations for evaluating a domain isolation rule for an object. An object identifier is received that identifies an object on which a system is attempting to perform an operation(s) (201). The object identifier identifies an object that is targeted by a command, an application, an instruction, invoked function, etc. For instance, the user is attempting to modify size of a file system or remove a volume group. As stated earlier, the object identifier may be indicated in a function call, an instruction in an executing script, an operation originating from a utility, an application, etc. The set of one or more operations may be implementing a command or instruction that originates from a command line, application instance, operating system process, background process, etc.

A domain(s) to which the user belongs is determined (203). For instance, the user may be a member of a human resources domain. When user data (e.g., credentials, profile, etc.) that represents a user account logged into a system is loaded, the domain identifier(s) indicated in the user data can be stored at a known or reserved location in the operating system space. When evaluating a domain isolation rule, an operating system process can access the known or reserved operating system space location for the domain identifier(s).

The object identifier is used to determine a domain isolation rule that governs the object (205). A set of domain isolation rules can be indexed by object identifiers. For instance, a kernel process locates a domain isolation rule using the object identifier as an index.

It is determined if the operation being attempted can be performed on the object based on domain membership (207). A kernel process evaluates the located domain isolation rule for the object and determines whether the domain of the user is indicated as a permitted domain. The kernel process may also determine whether the rule indicates that a user is required to be a member of all indicated permitted domains, or if the user is a member of a denied or conflict domain. If operation is permitted to be performed on the object, then operations continue at block 211. If operation is not permitted to be performed on the object, then operations continue at block 209.

An indication is returned that the operation is not permitted to be performed on the object if the user is determined to be a member of a denied domain or is not a member of a permitted domain (209). If the user is not a member of a permitted domain, then the operation initiated by or associated with the user cannot be carried out. A denied indication can be returned to the invoking code (e.g., a command parser). A notification can then be displayed that access is not permitted. For example, an error message can be displayed.

If the user credentials indicate a domain membership that satisfies the domain isolation rule for the object, then an indication is returned that the operation can be performed on the object (211). For instance, an allow indication is returned to a command parser, which allows the operation to be carried out.

The depicted flowchart is intended to aid in understanding the inventive subject matter, and should not be used to limit embodiments. Embodiments can perform additional operations, fewer operations, operations in a different order, operations in parallel, etc., than depicted herein. For instance, an indication may not be returned that an operation is not permitted access to an object. The executing code that evaluates the domain isolation rule may invoke an error handler or generate the deny message itself. Further, the domain isolation rules may not be indexed by object identifier. The domain isolation rules can be indexed by object type and then by object identifier. Hence, the rule evaluation code would determine the type of the object and initially access the domain isolation rules with the object type.

Domain based isolation of objects can be used in a system or an operating system that also implements a role based access control environment. Domain based isolation can provide an additional layer of control/security at a different degree of granularity than role based access. The use of domain based object isolation within a role based access control (RBAC) environment provides greater configuration flexibility. To illustrate, a user A may be associated with an administrator role. The administrator role is configured to allow performance of operations to mount devices and/or filesystems. The user A, in this illustration, is a member of a domain FINANCE. A root user configured a set of domain isolation rules to indicate the FINANCE domain as a permitted domain for a device DSK1, and to indicate a domain HR as a permitted domain for a device DSK2. If the user A attempts to mount the device DSK1, the operating system will allow the operation(s) to mount DSK1 to proceed. If the user A attempts to mount the device DSK2, the operating system will enforce the domain isolation rule for DSK2 and not allow the user A to mount DSK2. Hence, an organization can restrict operations, which are performed by a system responsive to commands and/or instructions, based on roles, and isolate objects based on domains. The permutation of domains and roles provides an organization with substantial flexibility to secure and manage resources. Embodiments can implement role based access control with domain based object isolation differently. For instance, role of a user can be evaluated before proceeding to evaluate a corresponding domain isolation rule. Alternatively, a domain isolation rule can be evaluated before evaluating role. In addition, a domain isolation rule can be evaluated in parallel with role of a user.

Furthermore, maintenance type operations are not depicted in the above figures. Embodiments can regulate removal of a domain from a node or machine based on disassociation from the associated object. Embodiments may regulate disassociation of domains from objects or removing of domain identifiers from domain isolation rules to avoid unintended release of an object from domain isolation. For example, a system may prevent a domain isolation rule from being modified to remove a domain A, unless other domains are specified. So, a domain PAYROLL could be disassociated from an object DSK0, as long as the domain PAYROLL is not the sole domain associated with the object DSK0. When attempting to remove an object, an interface can be displayed that indicates all domains associated with the object. The interface can allow an administrator to disassociate each of the domains from the object to allow removal of the object. Embodiments, however, are not constrained to preventing removal of objects until domain disassociation. In addition, domain isolation rules can be automatically updated or manually updated when a domain is removed. For instance, a repository of domains with their descriptions such as domain names and domain ids can be maintained. When an attempt is made to delete a domain, the maintenance code can provide some indication of the objects and/or domain isolation rules associated with the domain. A prompt can be displayed to confirm that the domain should be disassociated from the objects and removed from the domain isolation rules.

Domains can also be used to control access to physical memory space. Data in a physical memory space that has been used by a process sometimes endures after the process stops using the physical memory space (e.g., the process terminates). In addition, a virtual memory manager may allow processes of different applications to access a same memory space. For example, first application data can be paged out of a physical memory space to allow second application data to be paged into that same physical memory space. A process of the second application can then see at least some of the first application data that was not overwritten. Data of an application (e.g., a banking application) can be highly sensitive/confidential data. To prevent exposure of sensitive/confidential data, physical memory spaces can be designated for a specific domain or domains when the physical memory spaces are allocated. For instance, a banking application can be an object subject to a domain access rule that requires a user to be a member of a Banker domain and/or a Bank Manager domain. Thus, successful execution of the banking application requires a user to be a member of the Banker domain. When a process of the banking application obtains a physical memory space, that physical memory space will be designated for the Banker domain. Thereafter, the operating system limits access to that physical memory space to processes of the Banker domain.

Figure 3:
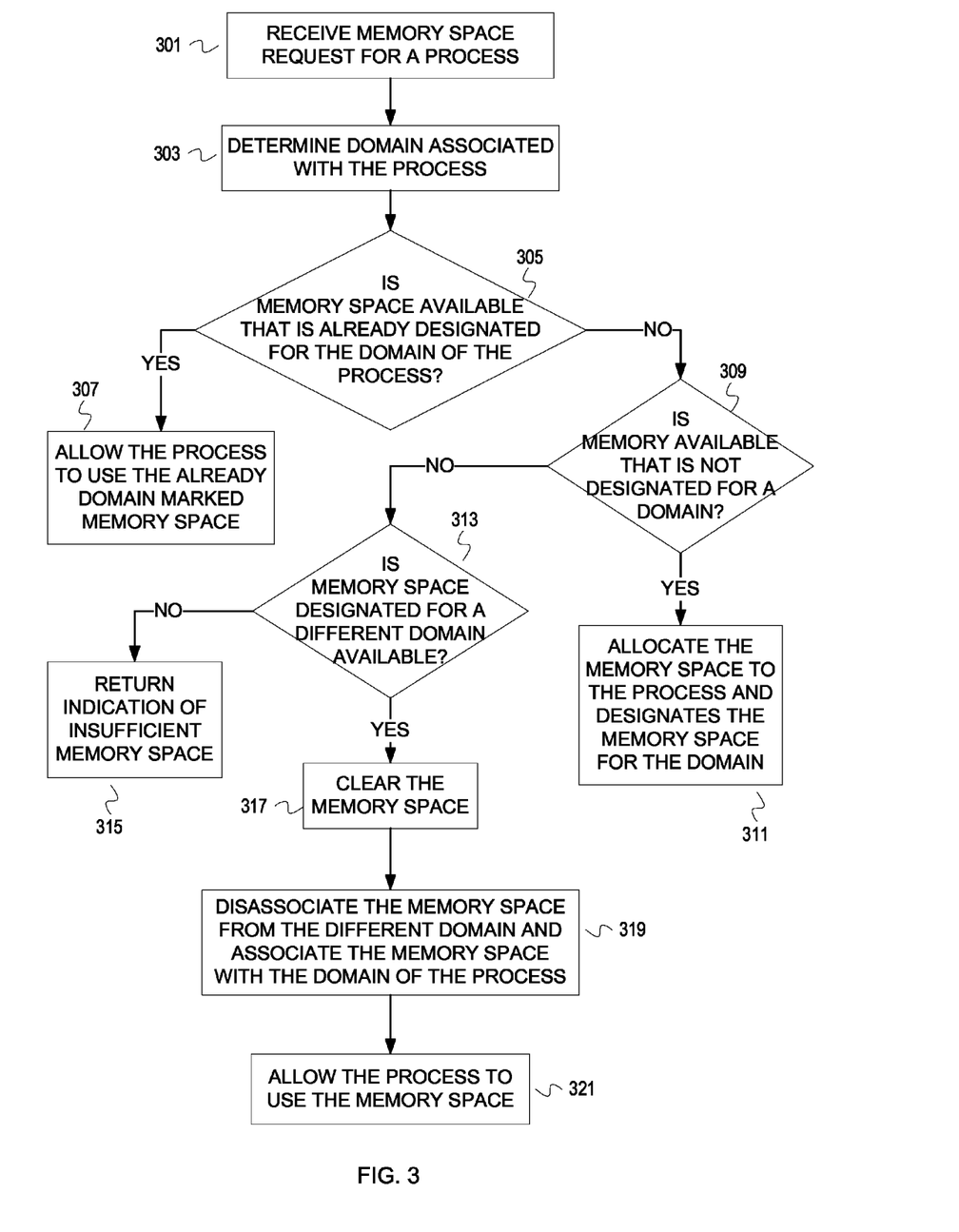
FIG. 3 depicts a flowchart of example operations for controlling access to physical memory spaces based on domains.

FIG. 3 depicts a flowchart of example operations for controlling access to physical memory spaces based on domains. A request for a physical memory space for a process is received (301). A process can submit a request to an operating system for memory space (e.g., execution of the function malloc). A process can also request expansion of already allocated memory space (e.g., execution of the function ralloc). Embodiments are not limited to submitting a request for memory space from a process to an operating system. The mentioned request for memory space for a process can represent a virtual memory manager to attempting to page data into a physical memory space for a process.

Responsive to the request for a physical memory space, a domain associated with the process is determined (303). For instance, a user associated with the process can first be determined. The domain(s) of the user can then be determined with the user credentials that were loaded into the operating system space at login. Embodiments can also directly associate the domain(s) of the user with the process. For example, a process control block can be instantiated for the process with fields to indicate the domain(s) of the logged in user.

It is then determined if physical memory space is available that is already designated for the domain (305). The operating system will determine if there is a physical memory space already designated for the domain, and if that physical memory space is sufficient. Embodiments can maintain a data structure instance that tracks address ranges of the physical memory designated or associated with the domain. For example, when a range of addresses of the physical memory are first allocated to a process, which is associated with a particular domain, then the operating system will indicate that particular domain for that range of addresses in the data structure instance ("domain memory tracking structure"). Embodiments can also designate the domain in the physical memory. For example, the operating system can write a domain identifier into a first portion of a physical memory space, and write a length or ending physical memory address for the physical memory space restricted to that domain into the first portion.

If there is sufficient physical memory space already designated for the domain, then the operating system allows the process to use the physical memory space (307). For instance, the operating system allocates the physical memory space to the process or pages in data of the process into the physical memory space.

If there is no sufficient memory already designated for the domain, then the operating system determines if sufficient physical memory space is available for the process, and if the physical memory space is not designated for any domain (309). For example, the operating system examines the domain memory tracking structure to determine a physical memory space that has not been designated for a domain.

If a physical memory space is available that is not designated to any domain ("undomained physical memory space"), then the operating system allocates that physical memory space to the process and designates the physical memory space for the domain associated with the process (311). The operating system can update a domain memory tracking structure to indicate the range of physical memory and the domain. Embodiments can also indicate the domain in the allocated physical memory space itself.

If undomained physical memory space is not available or insufficient, then the operating system determines if domained physical memory space (i.e., physical memory space designated to a domain) for a different domain is available (313). To be considered available, the domained physical memory space has either been released by an owning process or the owning process has terminated.

If no sufficient physical memory space is available, then the operating system returns an indication of insufficient memory space (315). Embodiments may implement a retry or timeout period before returning the insufficient memory space indication.

If domained physical memory space is available and sufficient, then the domained physical memory space is cleared by the operating system (317). For instance, a kernel process writes 0s into the entire domained physical memory space. Clearing of the domained physical memory space may disassociate the physical memory space from any domain.

If the domained physical memory space is associated with a domain elsewhere, then the operating system disassociates the physical memory space from the different domain (319). The operating system then associates the physical memory space with the domain of the process (319). If clearing the physical memory space disassociated the physical memory space from the different domain, then the operating system can write the domain of the process into the physical memory space to associate it with the domain. The operating system can overwrite the previous domain with the new domain to disassociate and associate in a single operation. For instance, a kernel process can update a domain memory tracking structure to perform the overwrite. Embodiments may also instantiate a domain memory tracking structure for each allocated physical memory space. In that case, a kernel process can either update the domain memory tracking structure instance with the new domain identifier or generate a new domain memory tracking structure instance and delete the old domain memory tracking structure instance. After the physical memory space has been properly cleared of data and associated with the domain of the process, the operating system allows the process to use/access the memory space.

An operating system may not always need to implement domain based access control of physical memory space. Thus, an operating system can implement turn the functionality on or off. For example, an operating system can default to the domain based access control of physical memory space being active, but allow an administrator to disable the functionality. An additional operation can check for a flag or bit that indicates whether the functionality is active. Embodiments can load different kernel code that implements the operations to those depicted in FIG. 3 or similar operations. Embodiments can also perform an operation to check whether the functionality is active periodically, or in response to an allocation request, for example. Similarly, embodiments can allow activation or disabling of operations that allow for reuse of domained memory space. An operating system may not perform the operations for reclaiming a memory space. An operating system can also implement different degrees of domain based physical memory space access control. At lower levels, available domained physical memory space can be cleared and designated for a different domain. At higher levels of security, the operating system can forbid reclaiming. Thus, domain association for a physical memory space would endure until reboot of the host machine.

Embodiments can also limit the amount of memory designated or associated to a domain. A kernel process can limit the amount of physical memory space associated with a domain. For instance, an administrator can configure the limit(s), which are then set in the operating system space.

Although the example operations refer to a single domain, access to a physical memory space can require a process to be associated with multiple domains. When initially allocating memory to a process, a kernel process can determine whether the operating system has been configured to require all domains of a process be associated with a physical memory space. When a subsequent process requests memory space, the kernel process will not restrict the process to a physical memory space of the same domains as the process.

The depicted flowcharts are intended to aid in understanding the inventive subject matter, and should not be used to limit embodiments. Embodiments can perform additional operations, fewer operations, operations in a different order, operations in parallel, etc., than depicted herein. For instance, an indication may not be returned that an operation is not permitted access to an object. The executing code that evaluates the domain access rule may invoke an error handler or generate the deny message itself. Further, the domain access rules may not be indexed by object identifier. The domain access rules can be indexed by object type and then by object identifier. Hence, the rule evaluation code would determine the type of the object and initially access the domain access rules with the object type.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
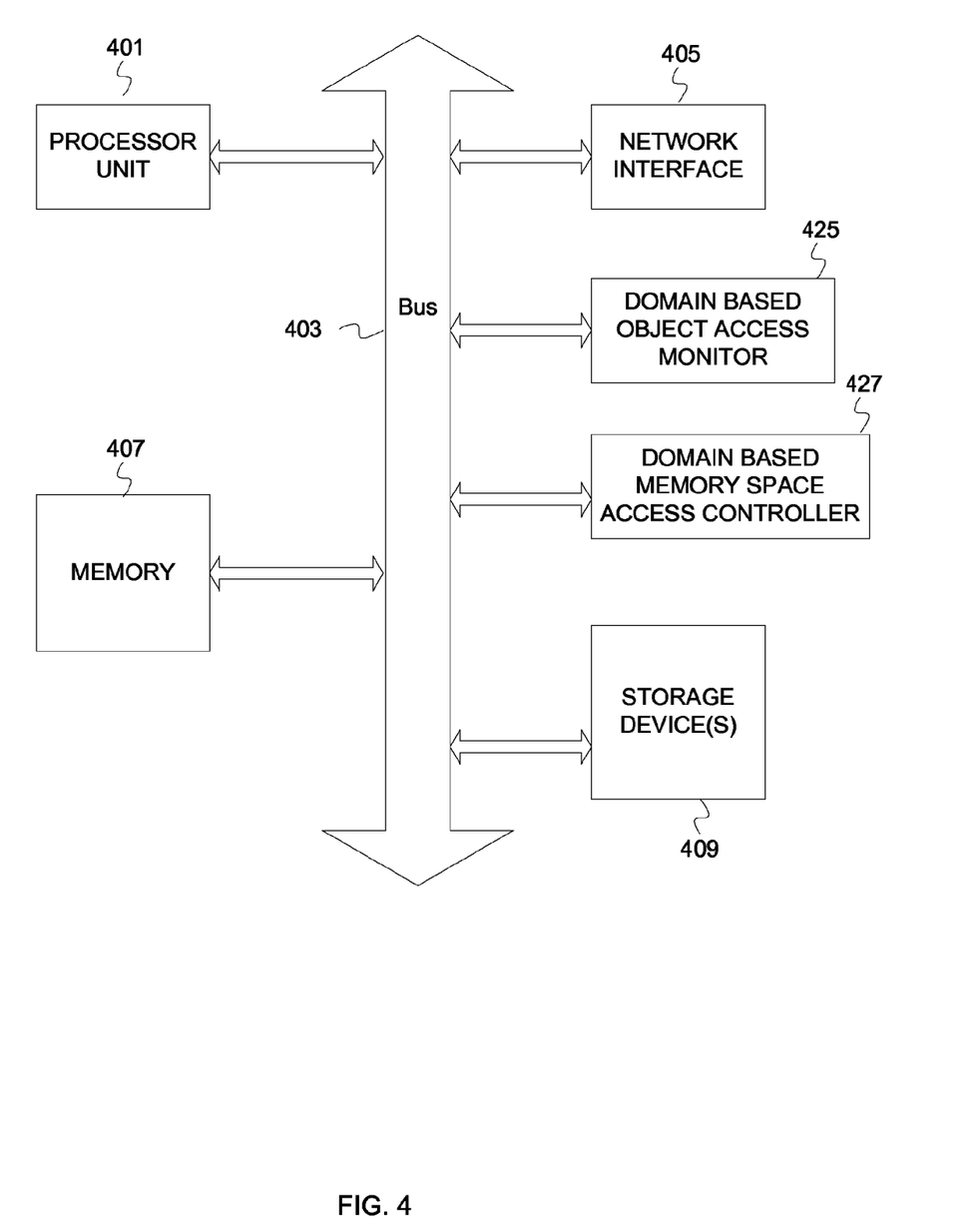
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport® bus, InfiniBand® bus, NuBus bus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The example computer system also comprises a domain based object access monitor 425 that is coupled with the bus 403. The domain based object access monitor determines whether a user can access (via a command, script operation, or an application operation) an object based on domain membership of the user. The domain based access monitor 425 evaluates a domain access rule that governs access to the object based with respect to domain membership of the user. The computer system also includes a domain based memory space access controller 427. The domain based memory space access controller 427 controls access to physical memory space based on domains as described earlier. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. For instance, the domain based memory space access controller 427 may be embodied in kernel code of the example computer system. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for domain based access control of a physical memory space as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter.

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining that a plurality of domains are associated with a first process in response to the first process requesting an operating system instance for access to a portion of a physical memory space, wherein each of the plurality of domains represents an organizational entity and the portion of the physical memory space is represented by at least a memory address;
   selecting a portion of the physical memory space that is not designated for a domain according to a plurality of domain isolation rules;
   adding an additional domain isolation rule to the plurality of domain isolation rules indicating that the plurality of domains are identified as allowable domains for the portion of the physical memory space, wherein the additional domain isolation rule further requires that a requesting process be associated with each of the plurality of domains for the portion of the physical memory space to be allocated to the requesting process;
   allocating the portion of the physical memory space to the first process;
   determining that a second process is associated with a first of the plurality of domains responsive to an attempt by the operating system instance to give the second process access to the portions of the physical memory space;
   selecting the additional domain isolation rule indicating that the plurality of domains are identified as allowable domains for the portion of the physical memory space;
   determining that the additional domain isolation rule requires that the second process be associated with each of the plurality of domains;
   preventing the second from accessing the portion of the physical memory space based on the additional domain isolation rule.

2. The method of claim 1, wherein the attempt by the operating system instance to give the first process access to the portion of the physical memory space is responsive to one of a request from the first process for allocation of the portion of the physical memory space to the process, a request from the first process for expansion of a second physical memory space already allocated to the first process, and a memory manager attempting to swap in a page of the first process into the physical memory space.

3. The method of claim 1, further comprising one of writing an identifier of the plurality of domains into the portion of the physical memory space and writing the identifier into an instance of a data structure that tracks physical memory spaces and domains.

4. The method of claim 1 further comprising:
   determining that a second portion of the physical memory space is designated for only the first of the plurality of domains; and
   allowing the second process to access the second portion of the physical memory space; and
   preventing the first process from accessing the second portion of the physical memory space.

5. The method of claim 4 further comprising:
   determining that the second process is associated with the first of the plurality of domains; and determining that the second portion of the physical memory space is available.

6. The method of claim 5, wherein said determining that the second portion of the physical memory space is available comprises determining that the second portion of the physical memory space has been released by a previous owner process.

7. A method comprising:
determining that a first process is associated with a plurality of domains responsive to the first process requesting from an operating system instance for access to a first portion of a physical memory space, wherein the domain represents an organizational entity and the first portion of the physical memory space is represented by an address into physical memory of a machine;
selecting a first of a plurality of domain isolation rules that indicates a range of addresses of the physical memory that includes the first portion of the physical memory space;
determining that the plurality of domains are identified as allowable domains for the range of addresses by the first of the plurality of domain isolation rules;
determining that the first of the plurality of domain isolation rules requires a requesting process to be associated with all of the plurality of domains for the range of the addresses of the physical memory space to be allocated to the requesting process;
allocating the first portion of the physical memory space to the first process
determining that a second process is associated with a first of the plurality of domains responsive to an attempt by the operating system instance to give the second process access to a the first portion of the physical memory;
selecting the first of a plurality of domain isolation rules that indicates the range of addresses of the physical memory based, at least in part, on the range of addresses including the address;
determining that the plurality of domains are indicated as allowable domains for the range of addresses by the first of the plurality of domain isolation rules;
determining that the first of the plurality of domain isolation rules requires all of the plurality of domains for access of the physical memory space corresponding to the range of the addresses; and
preventing the second process from accessing the first portion of the physical memory space based on the first of the plurality of domain isolation rules.

8. The method of claim 7 further comprising:
determining that a second range of addresses of the physical memory is designated for the first of the plurality of domains; and
allowing the second process to access the second range of addresses of the physical memory.

9. A computer program product for domain isolation of physical memory space, the computer program product comprising:
a non-transitory computer readable storage medium having computer usable program code embodied therewith, the computer usable program code executable to cause a processor to perform operations comprising:
determining that a plurality of domains are associated with a first process in response to the first process requesting an operating system instance for access to a portion of a physical memory space, wherein each of the plurality of domains represents an organizational entity and the portion of the physical memory space is represented by at least a memory address;
selecting a portion of the physical memory space that is not designated for a domain according to a plurality of domain isolation rules;
adding an additional domain isolation rule to the plurality of domain isolation rules indicating that the plurality of domains are identified as allowable domains for the portion of the physical memory space, wherein the additional domain isolation rule further requires that a requesting process be associated with each of the plurality of domains for the portion of the physical memory space to be allocated to the requesting process;
allocating the portion of the physical memory space to the first process;
determining that a second process is associated with a first of the plurality of domains responsive to an attempt by the operating system instance to give the second process access to the portions of the physical memory space;
selecting the additional domain isolation rule indicating that the plurality of domains are identified as allowable domains for the portion of the physical memory space;
determining that the additional domain isolation rule requires the second process be associated with each of the plurality of domains; and
preventing the second process from accessing the portion of the physical memory space based on the additional domain isolation rule.

10. The computer program product of claim 9, wherein the attempt by the operating system instance to give the first process access to the portion of the physical memory space is responsive to one of a request from the first process for allocation of the portion of the physical memory space to the process, a request from the first process for expansion of a second physical memory space already allocated to the first process, and a memory manager attempting to swap in a page of the first process into the physical memory space.

11. The computer program product of claim 9, wherein the operations further comprise one of writing an identifier of the plurality of domains into the portion of the physical memory space and writing the identifier into an instance of a data structure that tracks physical memory spaces and domains.

12. The computer program product of claim 9, wherein the operations further comprise:
determining that a second portion of the physical memory space is designated for the first of the plurality of domains;
allowing the second process to access the second portion of the physical memory space; and
preventing the first process from accessing the second portion of the physical memory space.

13. The computer program product of claim 12, wherein the operations further comprise:
determining that the second process is associated with the first of the plurality of domains; and
determining that the second portion of the physical memory space is available.

14. The computer program product of claim 13, wherein said operation of determining that the second portion of the physical memory space is available comprises determining that the second portion of the physical memory space has been released by a previous owner process.

* * * * *